Oct. 23, 1956
E. D. MOSHER
2,768,011
FACE SEAL
Filed Dec. 5, 1952
2 Sheets-Sheet 2
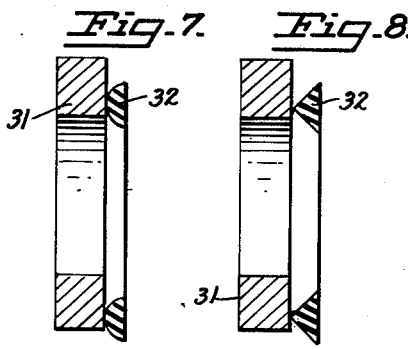
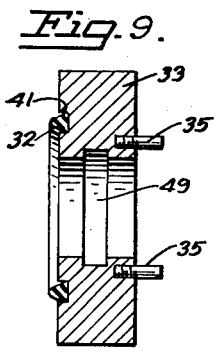
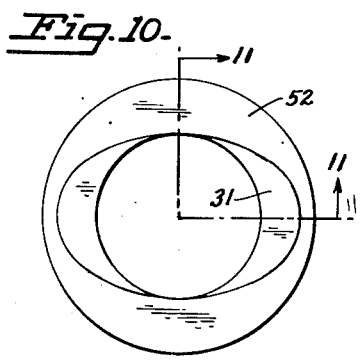
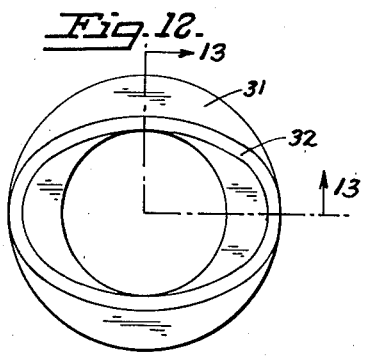
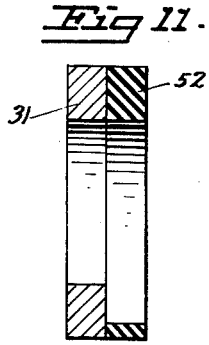
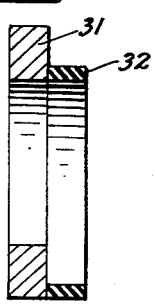
INVENTOR.
EZRA D. MOSHER
BY
ATTORNEY

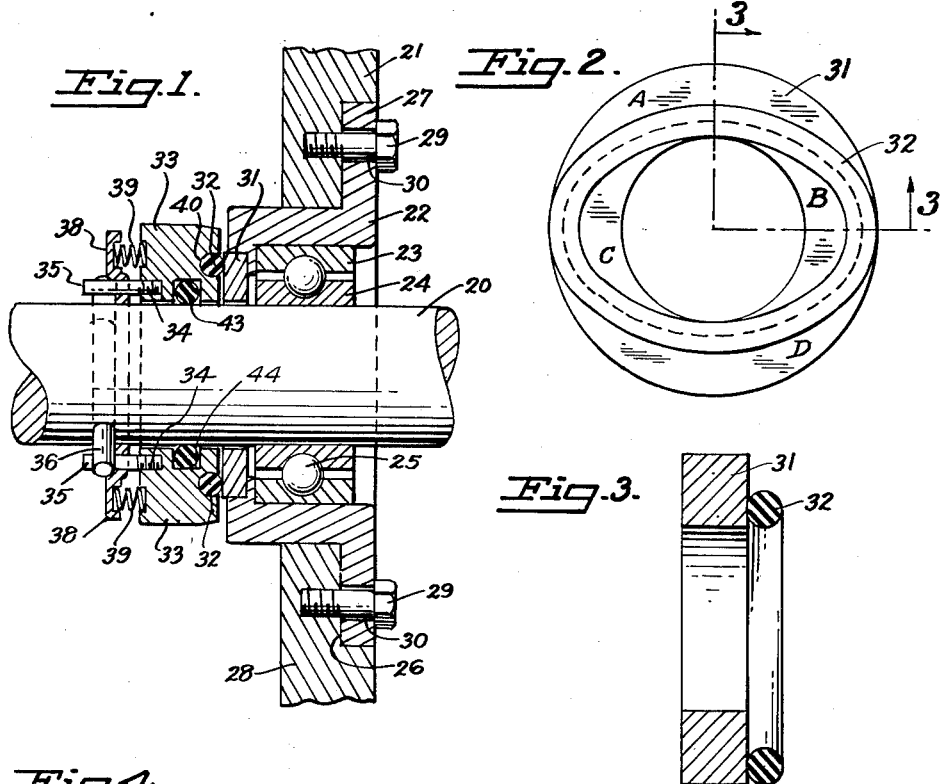
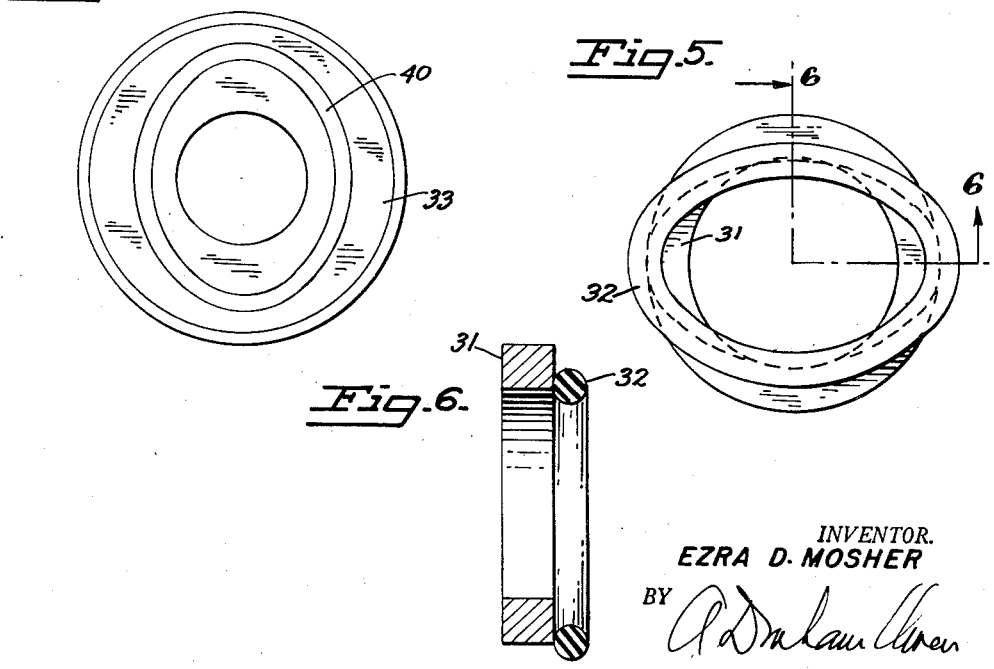

United States Patent Office 2,768,011
Patented Oct. 23, 1956

2,768,011

FACE SEAL

Ezra D. Mosher, Palo Alto, Calif., assignor, by mesne assignments, to Federal-Mogul-Bower Bearings, Inc., Detroit, Mich., a corporation of Michigan Application December 5, 1952, Serial No. 324,297

9 Claims. (Cl. 286—11.15)

This invention relates to seals of the end thrust type, in which an annular sealing lip is adapted to bear under spring pressure against some associated machine part, under conditions of relative rotation.

A particular seal of this type is known as a "face seal," in which opposing annular discs of metal, carbon, or other materials are carefully lapped to provide extremely finely finished flat opposing faces. This careful matching of opposing surfaces creates an effective fluidtight seal for relatively rotating parts. However, there are many disadvantages inherent in lapped face seals of the character described. The finely finished, mated surfaces are difficult and expensive to manufacture, and careful assembly of the seal is required to align properly the seal faces. Even the slightest degree of axial misalignment will often destroy the necessary parallel relation between the faces, and prevent an effective seal.

It is also essential in this type seal that no dirt or grit get between the seal faces. The presence of such dirt particles may cause a marring of the lapped faces and may prevent an effective seal. It is also necessary to use relatively high spring pressures, forcing the seal faces together, to insure proper functioning of the seal. Such high spring pressures cause an appreciable torque loss between the non-rotating and rotating members and an overall loss of efficiency in the operation of any machines using the face seal, such as a water pump in automotive installations, for example.

The present invention is directed to a solution of all the above problems, and others that will become evident hereinafter, by the use of a simple resilient sealing member that eliminates the necessity of finely finished flat sealing surfaces and which is inexpensive and easy to manufacture.

Another object of this invention is to provide a sealing member that requires low spring pressure, and consequent low torque losses, while maintaining high unit pressures between the sealing surfaces.

Another object of this invention is to provide a seal in which the flat surfaces used may be cheaply and easily manufactured and of ordinary materials.

Another object of this invention is to provide a seal that is self-cleaning, and which will not be harmfully effected by the presence of dirt particles.

Another object of this invention is to provide a seal that will function effectively under conditions of misalignment of its sealing members.

Other objects and advantages of the invention will be apparent from the following description and from the drawings in which:

Fig. 1 is a longitudinal section showing the face seal of this invention mounted in sealing relation between a rotating shaft and the stationary wall portion of a housing, with parts in elevation.

Fig. 2 is a plan view of the sealing portions of the face seal, utilizing an elliptical resilient sealing ring.

Fig. 3 is a section on the line 3—3 of Fig. 2.

Fig. 4 is a plan view of a seating member for a resilient sealing ring of elliptical shape.

Fig. 5 is a plan view similar to Fig. 2, showing a modified positioning of an elliptical sealing ring with respect to the other sealing element.

Fig. 6 is a section on the line 6—6 of Fig. 5.

Figs. 7 and 8 are similar sections of resilient sealing rings having semi-circular and triangular cross sections.

Fig. 9 is a section showing a resilient sealing member in a groove in a seating disc.

Fig. 10 is a plan view of the sealing portions of a face seal utilizing a sealing element that has both elliptical and circular portions.

Fig. 11 is a section on the line 11—11 of Fig. 10.

Fig. 12 is a plan view of an elliptical sealing ring, similar to Fig. 2, except for the cross-sectional shape of the sealing member.

Fig. 13 is a section on the line 13—13 of Fig. 12.

Referring to Fig. 1, 20 designates a rotatable shaft protruding through the wall portion 21 of a housing. Supporting the shaft in the wall is a recessed ring 22 having a roller bearing race 23 press fitted into it. Opposing race 24 is secured to the shaft 20 for rotation on the rollers or balls 25. To allow both the shaft and the roller bearing to be secured in the wall, as a unit, the wall may be recessed, as at 26, to receive a flange 27 on the ring 22. This construction allows easy insertion of ring 22 and shaft 20 into the wall 21. The flange 27 is securely held in the recess 26 by means of cap screws 29 which pass through openings 30 in the flange 27.

The face seal of this invention is comprised of a radial sealing disc 31, a resilient sealing ring 32, and a radial seating disc 33 for the resilient sealing ring. The seal is effected between the radial sealing face of the sealing disc 31 and the contacting surface of the resilient sealing ring 32, as is hereinafter more fully described. The radial seating disc 33 has two diametrically opposed, threaded recesses at 34, into which threaded bars 35 are inserted. Inserted through the shaft, and rotatable therewith, is a driving pin 36. A driving connection between seating disc 33 and the shaft is obtained by the ends of driving pin 36 pressing against opposite sides of the bars 35. A recessed spring retaining ring 38, adjacent the driving pin 36 and having openings for the bars 35, is provided to support springs 39, which urge the sealing members 31 and 32 together. Both the retaining ring 38 and the seating disc 33 may be provided with circular depressions to hold springs 39 in position. The sealing disc 31 is secured to the ring 22, as by press fitting, and is held stationary, relative to the rotating shaft 20. It is apparent, that as shaft 20 rotates, pin 36 will cause seating disc 33 and sealing ring 32 to rotate relative to radial sealing disc 31; and the ring 38 and springs 39 will also rotate with seating disc 33, urging sealing ring 32 and sealing disc 31 together. A seal along the shaft axis is provided by means of a circular elastic seal 43 which seats in annular groove 44 in the inner cylindrical surface of sealing disc 33.

The structure just described is illustrative of one form of device in which the basic features of the invention may be incorporated. The design of the supporting parts may be varied to suit any particular engineer's choice and still incorporate the present invention. For example, while the part 33 is described as a disc having an opposing face and a groove cut therein, this is just one form it could take. The ring 32 does the sealing against the face 31 so whether the part 33 has more of a face than is necessary to support the ring 32 is immaterial.

For the purposes of this invention, it is necessary that portions of the elastic sealing ring 32 be spaced farther from the shaft axis than others. A generally torroidal shape is preferred, although other shapes may be suitable if the feature of uneven spacing is retained. One form of suitable sealing ring is the elliptical ring shown in Figs. 2 and 5. While in these and other of the drawings the uneven spacing of the sealing member from the shaft axis is substantial, it may be more or less so, again depending on a particular engineer's choice and the amount of sweep needed to accomplish a good sweeping of the surface of the face 31.

For the shape of sealing ring in Figs. 2 and 5 an elliptical groove 40 is provided in seating disc 33, as is best seen in Fig. 4. The sealing ring need not be cemented or mechanically anchored in the groove 40 since the elliptical shape prevents the sealing ring from running loose in the groove. The springs 39 will hold the sealing ring in longitudinal position during normal operation, and prevent its coming out of the groove. This construction permits independent manufacture of a cheap, easily replaceable, sealing ring; and greatly reduces the over all assembly costs of the face seal unit.

The peculiar advantages due to spacing portions of the sealing member farther from the shaft axis than others may be explained with reference to Fig. 2. If the sealing ring 32 is rotated clockwise over the sealing disc 31, it is apparent that in quarters A and D, any foreign substances will be swept off the face of disc 31 by the increasing diameter of the sealing element 32. Likewise, on quarters B and C, any oil (or other fluid being sealed) that might tend to escape from the shaft axis will be swept towards the center by the rotating elliptical ring. The face of this sweeping action also prevents any "grooving" of opposing rotating sealing surfaces and consequently greatly reduces the wear in the contact area of the sealing parts.

Referring to Fig. 3, it can be seen that the sweeping action will occur between the inner and outer positions shown for sealing ring 32. However, varying arrangements of the sealing ring, with respect to the sealing disc 31, may be obtained. The groove 40 for the elliptical ring 32 may be designed to support the ring 32 so it sweeps the entire face of the disc 31, as shown in Figs. 5 and 6.

An important feature of this invention is a cross-sectional design of the sealing ring 32, which will permit relatively low spring pressures while maintaining a high unit pressure between the sealing surfaces. In the form illustrated in Figs. 2 and 3, the sealing ring 32 has a circular cross section, thereby giving a line of contact at the point of tangency between the ring 32 and the disc 31. It is noted that the groove 40 preferably has a circular cross section, as seen in Fig. 1, when used with a sealing ring of the types in Figs. 3 and 6, although a squared groove will function satisfactorily. It is evident that this line of contact will reflect a high unit pressure, with respect to the pressure exerted by springs 39, between the sealing ring 32 and disc 31. This high unit pressure, coupled with the resilience of the sealing ring 32, makes possible the use of a comparatively rough sealing surface on the sealing disc 31, rather than an expensive lapped, or finely finished, surface. Consequently, the sealing disc 31 can be ordinary steel or bronze or some relatively inexpensive composition material, such as Bakelite, instead of costly machine tool steel, delicate carbon, or like materials. Likewise, the seating disc 33, requiring no mating surface, may also be made of ordinary materials, and could even be die cast with the sealing ring groove molded into it.

A further advantage arising from the low spring pressures, allowed by "line contact," would be less torque loss due to frictional drag between the sealing faces. The advantage gained from the smaller contact area does not detract from the effectiveness of the seal, however, since the high unit pressure insures a tight seal at all times.

Fig. 8 illustrates a modified triangular form of sealing ring cross section, which will also produce a thin line of contact. If preferred, the triangular end may be slightly flattened or rounded as shown in Fig. 9. Fig. 7 illustrates a further modification utilizing a semi-cylindrical cross section. The seating grooves 40 or 41 should preferably be rectangular, when the modified forms of Figs. 7 or 8 are used for the sealing ring 32, as shown in Fig. 9.

The sealing ring is preferably made of a highly elastic material, such as rubber or rubber-plastic. However, a sealing ring of metal, although relatively less resilient, will function properly; but requires a more finely finished, sealing face for sealing disc 31. A further advantage of the more elastic sealing ring is the ease with which the sealing surfaces may be aligned and conformed to make a fluid tight fit. If the shaft 20 is not perpendicular to the wall 21, for example, the faces of seating disc 33 and sealing disc 31 will not be parallel. However, the pliable sealing ring 32 and the loose fit of the ring 33 on the shaft will compensate for axial misalignment of this sort and will greatly facilitate installation and functioning of the seal.

If greater wearing characteristics at the point of contact, rather than low torque losses, are desired, other forms for the sealing ring will, of course, be feasible. For example, the sealing ring may be a circular disc 52 of equivalent diameter to disc 31, having an elliptical bore, as shown in Figs. 10 and 11. In this form the internal liquid return feature predominates, with grit exclusion depending on the external flush faces of the opposing discs. The sealing ring might also be an elliptical disc, having a circular bore, in which case the dirt exclusion feature would predominate. Figs. 12 and 13 show a further modification of the elliptical type sealing ring 32, having a rectangular cross section. Still further modifications might be based on the semi-circular or triangular cross sections illustrated in Figs. 7 and 8, whereby the flat surface would contact sealing disc 31. It is to be noted that in each of these forms a flat surface contact, of substantial width, is provided between the sealing ring and the sealing disc, giving a greater wearing area. However, the combined circular-elliptical form of Fig. 11, for example, could be adapted to a line of contact seal by using circular, triangular, or semi-circular cross sections as previously explained.

The many advantages of a face seal that utilizes an elastic sealing ring, spaced unevenly from the shaft axis according to the present invention, may be summarized breifly as follows: the sealing ring may be easily and cheaply manufactured; it will not slip around in its groove in the seating disc; the seating disc may be inexpensively machined or cast from ordinary materials; the opposed sealing disc may likewise be inexpensively manufactured from ordinary materials; the sealing disc need not be in perfect alignment due to the elliptical shape of the sealing ring; the sealing disc will be swept clean of any dirt by the change of diameter; escaping internal liquid will likewise be swept back across the disc towards the shaft axis; and due to the line contact of the sealing ring, relatively low spring pressures may be used resulting in a minimum of torque loss. The economies of the present seal make it adaptable to many new uses and differing environments. For example, it may be used as an oil seal by using a ring of synthetic rubber; or a water seal in machinery parts, as a washing machine, by using ordinary rubber or plastic; or it may be adapted to high and low temperature work, by utilizing a silicone rubber or plastic composition. Also the structure of the face seal may, of course, be readily adapted to differing machinery requirements.

For example, the sealing ring could be held stationary in the wall portion, and the flat sealing disc 31 become the rotating member. Also the sealing ring need not be elliptical, but may take any uniform toroidal shape, or even an irregular shape, if the essential spacing characteristics are retained.

Another advantage of the invention is that by having the groove, in which the ring 32 is held, arranged as either an ellipse or other irregular shape, the ring 32 locks itself against rotation in its groove. This facilitates assembly and easy replacement of the ring 32, and obviates the need for special anchoring means to hold the ring against rotation.

To those skilled in the art to which this invention relates, many other changes in construction and widely differing embodiments and applications of the invention will also suggest themselves without departing from the spirit and scope of the invention. The disclosures and the description herein are purely illustrative and are not intended to be in any sense limiting.

I claim:

1. In an end thrust face seal for a rotating shaft; a first radial member having a radial sealing face; a second radial member having an adjacent radial sealing face; said first radial member having a continuous groove in it to support said radial sealing face, a portion of which groove lies closer to the center of the shaft than the balance of said groove; a resilient sealing member in said groove comprising said radial sealing face and adapted to bear against said adjacent radial sealing face, whereby on relative rotation of said radial members said resilient member will sweep radially across said adjacent face in a sealing manner; said groove and said sealing member being elliptical in shape.

2. The device of claim 1 wherein said resilent sealing member is substantially circular in cross section.

3. The device of claim 1 wherein said resilient sealing member is triangular in cross section.

4. The device of claim 1 wherein said resilient sealing member is semi-circular in cross section.

5. The device of claim 1 wherein said resilient sealing member is quadrilateral in cross section.

6. In combination, a face seal comprising a pair of ring members having radial faces in closely spaced relation, one of said members having a smooth radial surface facing the other member, a resilient sealing ring, means on the other member for supporting said resilient sealing ring flush against the radial face of the first member, said resilient ring having an elliptical contour on its inner periphery, the major axis of said elliptical contour being materially less than the outer diameter of said one ring member and its minor axis being substantially the same as the inner diameter of said one ring member whereby the lubricated exposed areas of said one ring member are continually swept by said resilient sealing ring to provide a continuously replenished film of lubricant between the surfaces of said members as they rotate relatively to one another.

7. The combination defined in claim 6 wherein said resilient sealing ring has a wide radial sealing surface with an elliptical contour on its inner periphery and an annular contour on its outer periphery.

8. The device of claim 7 wherein said resilient sealing ring has a wide flat surface adapted to seat against the radial surface of said one ring member.

9. The combination defined in claim 6 wherein said resilient sealing ring is composed primarily of rubber.

References Cited in the file of this patent

UNITED STATES PATENTS

| | | |
|---|---|---|
| 1,699,385 | Whittingham | Jan. 15, 1929 |
| 1,740,682 | Carrey | Dec. 24, 1929 |
| 1,955,860 | Peters | Apr. 24, 1934 |
| 2,189,686 | Stevenson | Feb. 6, 1940 |
| 2,247,505 | Kohler | July 1, 1941 |
| 2,525,652 | Cunningham | Oct. 10, 1950 |
| 2,575,549 | Doble | Nov. 20, 1951 |
| 2,691,542 | Chenoweth | Oct. 12, 1954 |

FOREIGN PATENTS

| | | |
|---|---|---|
| 474,238 | Great Britain | Oct. 27, 1937 |
| 514,988 | Germany | Dec. 22, 1930 |
| 594,446 | Germany | Mar. 16, 1934 |